May 1, 1956    E. D. GRAVES ET AL    2,743,753
APPARATUS FOR MAKING PRESSURE SENSITIVE LABELS
Original Filed Sept. 20, 1946    3 Sheets-Sheet 1
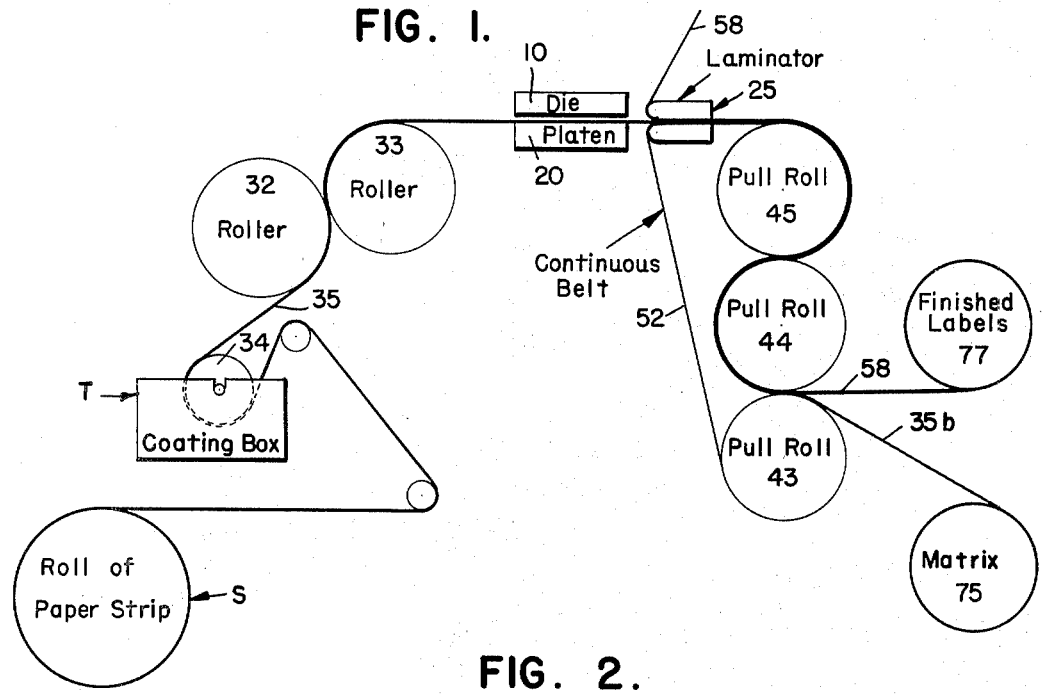
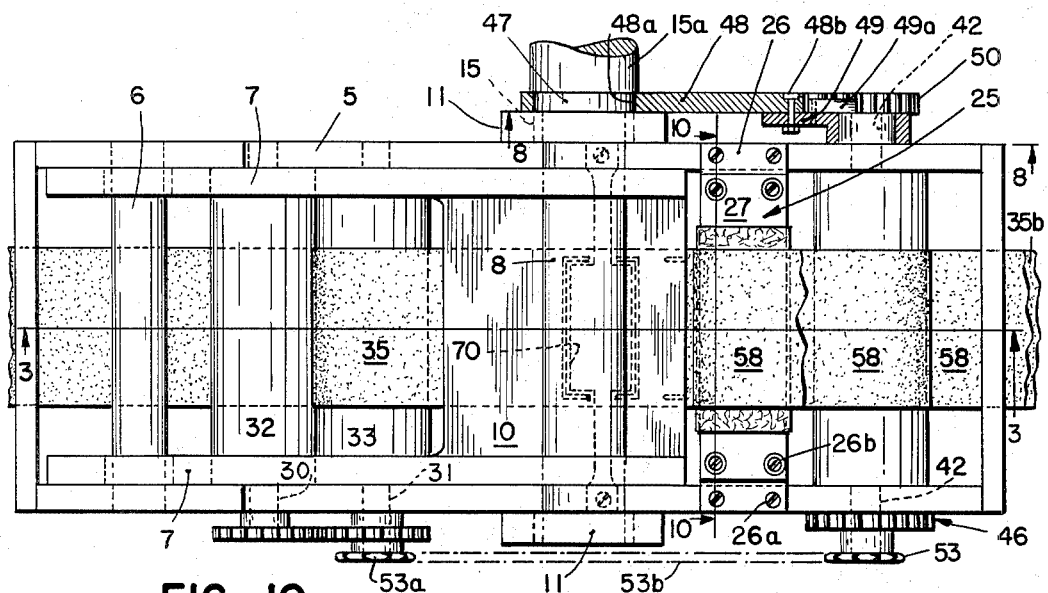
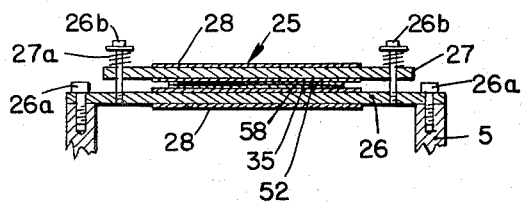
INVENTORS
ELIOT D. GRAVES
MURRAY McDOUGAL
BY
Mason & Graham
ATTORNEYS May 1, 1956   E. D. GRAVES ET AL   2,743,753
APPARATUS FOR MAKING PRESSURE SENSITIVE LABELS
Original Filed Sept. 20, 1946   3 Sheets-Sheet 2

INVENTORS
ELIOT D. GRAVES
MURRAY McDOUGAL
BY
*Mason & Graham*
ATTORNEYS

May 1, 1956    E. D. GRAVES ET AL    2,743,753
APPARATUS FOR MAKING PRESSURE SENSITIVE LABELS
Original Filed Sept. 20, 1946    3 Sheets-Sheet 3
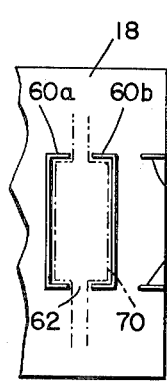
FIG. 5.
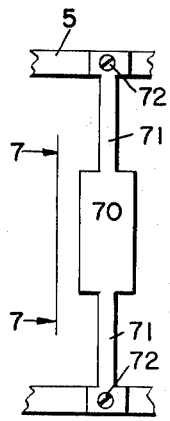
FIG. 6.
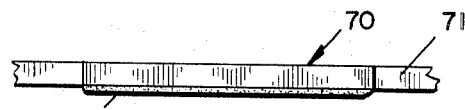
FIG. 7.
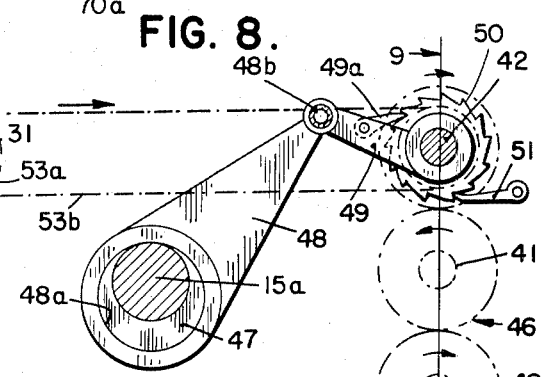
FIG. 8.
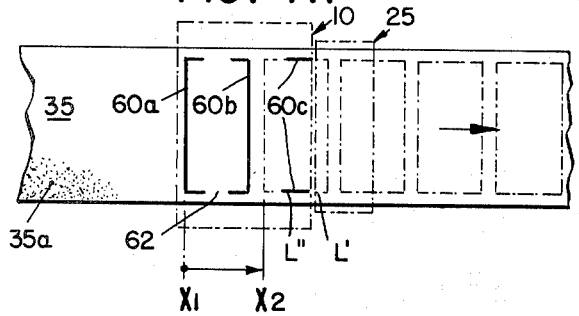
FIG. 11.
FIG. 9.
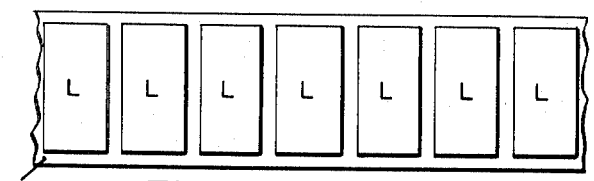
FIG. 12.
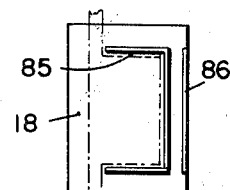
FIG. 13.
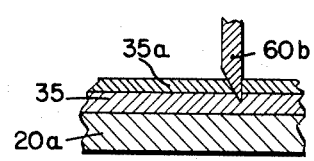
FIG. 16.
FIG. 14.    FIG. 15.
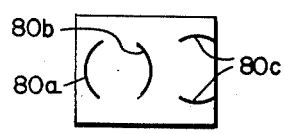
INVENTORS
ELIOT D. GRAVES
MURRAY McDOUGAL
BY
ATTORNEYS

United States Patent Office 2,743,753
Patented May 1, 1956

2,743,753

APPARATUS FOR MAKING PRESSURE SENSITIVE LABELS

Eliot D. Graves, Pasadena, and Murray McDougal, Glendale, Calif., assignors to Contact Products, Inc., Pasadena, Calif., a corporation of California Original application September 20, 1946, Serial No. 698,376. Divided and this application March 20, 1950, Serial No. 150,622

5 Claims. (Cl. 154—1)

This invention has to do with the art of making pressure sensitive labels of the type wherein a label, coated with a pressure sensitive or permanently tacky adhesive, is temporarily mounted upon a backing sheet from which it may be removed for application to an article to be labeled, having more particularly to do with novel apparatus for making such labels. This application is a division of our co-pending application Serial No. 698,376, filed September 20, 1946 which application matured into Patent No. 2,560,566 on July 17, 1951.

Conventionally, such labels are made by the method of first adhering the adhesively coated label-forming sheet to a "glassine" backing sheet and then dieing out of the label-forming sheet the outlines of the labels without cutting into the backing sheet, and then separating from the backing sheet the waste or matrix portion of the label-forming sheet—that is, those portions of the label-forming sheet surrounding the cut defining the label outline. Since the "glassine" backing sheet is very thin in section, it is very necessary to maintain extremely meticulous adjustment of the parts of the label-making machine lest the backing sheet be scored or cut to such an extent as to become so weakened that it will break and necessitate a shut-down of the machinery until the strips may be re-threaded through the machine. Such weakening of the backing sheet also interferes with the dispensing of such labels.

Another disadvantage of prior art label-making methods and apparatus is due to the fact that they must utilize a pre-combined composite strip consisting of the label-forming sheet adhered to a backing sheet. Such composite sheets are usually stock items which have been stored and the adhesive frequently becomes relatively hardened, rendering it difficult, without frequent breakage, to strip from the backing sheet the matrix or waste portion of the label-forming strip after the labels have been died therefrom.

It is an object of our invention to provide apparatus for making such labels wherein the dieing or cutting of the labels from the label-forming sheet is performed against a platen and before the label is mounted upon the backing sheet. This eliminates any possibility of cutting or scoring the backing sheet.

Another and more particular object is to provide a system of label making wherein the label is partially died or cut from the label-forming strip and, after a portion of the cut label has been adhered to the backing sheet, the final die cut completely severing the label from the label-forming sheet is made.

Another object is the provision of means for continuously forming the labels from an elongated forming strip and mounting them upon an elongated strip of backing material which may be formed into a roll for convenient use.

It is also an object of the invention to provide apparatus for making such labels whereby the label-forming strip is not coated with adhesive until immediately prior to the cutting of the label shape from the strip and whereIn the matrix is stripped from the backing sheet immediately after it is adhered thereto. This provides the advantage that it is much easier to strip the freshly coated matrix or waste from the backing sheet.

An additional object is to provide, in such apparatus, a die construction which is highly economical.

Our invention is furthermore characterized by certain novel and advantageous features of apparatus for forming such labels, such, for instance, as the novel form of die which we have devised; the improved means of stripping the cut label portion from the die which enables the cutting of the label-forming strip when the adhesively coated side of the strip is facing the cutting die; our novel means for combining the cut label-forming strip with the backing strip, as well as other features, which will appear as the following description of a presently preferred embodiment of our invention progresses. In this connection, however, we wish to point out that while the specific procedures and arrangements which we are about to describe constitute one of the preferred embodiments, in its broader aspects as defined by the accompanying claims we contemplate that our invention may be carried out in other and modified specific physical forms of apparatus which will be apparent to those skilled in this art from a reading of the ensuing description.

For purposes of the following explanation of the invention we shall refer to the accompanying drawings, in which:

Fig. 1 is a diagrammatic showing of our apparatus;

Fig. 2 is a top plan view of our apparatus;

Fig. 5 is a plan view taken on line 5—5 of Fig. 4;

Fig. 6 is a plan view of the label-stripping element;

Fig. 7 is an enlarged view taken on line 7—7 of Fig. 6;

Fig. 8 is a fragmentary sectional view taken on line 8—8 of Fig. 2;

Fig. 9 is a fragmentary sectional view taken on line 9—9 of Fig. 8;

Fig. 10 is a sectional view taken on line 10—10 of Fig. 2;

Fig. 11 is a view taken in plan illustrating a series of labels being formed from a label-forming strip and mounted on a backing sheet;

Fig. 12 is a top plan view of finished labels mounted on a backing sheet;

Fig. 13 is a plan view similar to Fig. 5 but showing a modified form of die and cutting sequence;

Fig. 14 is a plan view similar to Fig. 5 but showing a modified form;

Fig. 15 is a plan showing the labels illustrated in Fig. 14 mounted on a backing sheet; and Fig. 16 is an enlarged fragmentary section showing a detail of cutter edge.

Figure 3:
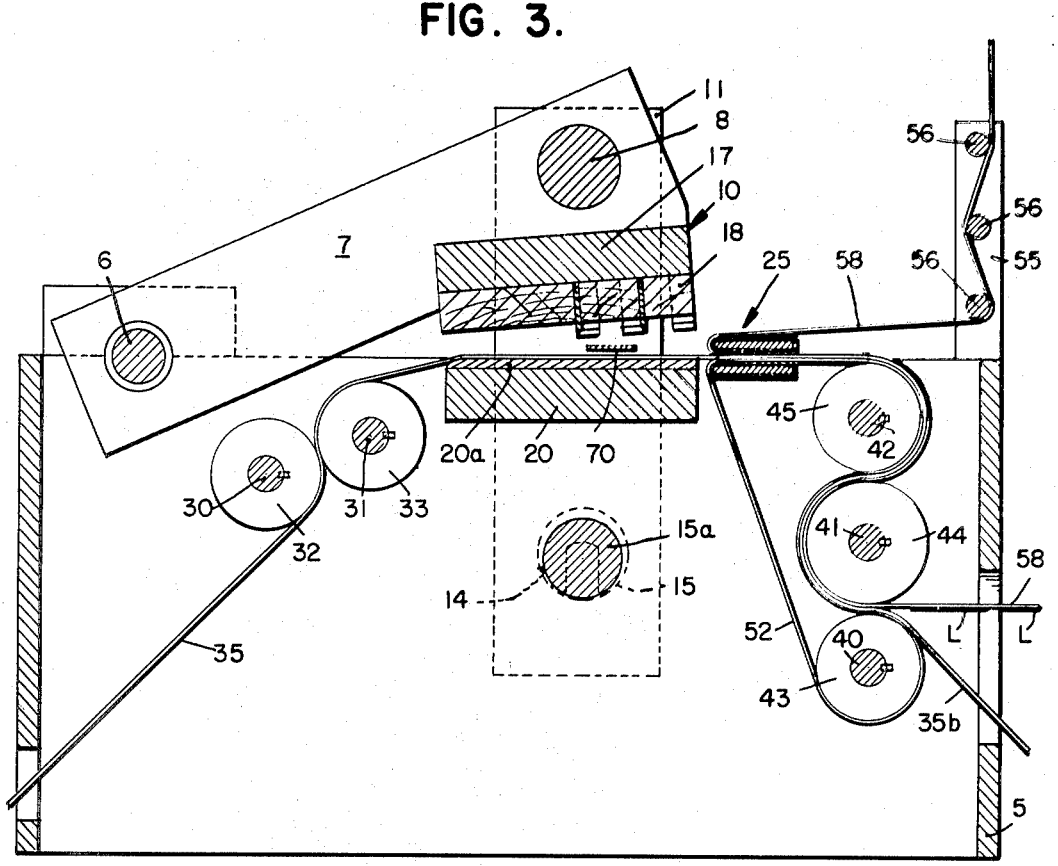
Fig. 3 is an enlarged section taken on line 3—3 of Fig. 2.

Referring now to the accompanying drawings, we show at 5 a body having a spindle 6 upon which are pivotally mounted the guide arms 7 of an oscillating head 10. The head also includes upright arms 11 each having a circular opening 14 within which a power driven eccentric 15 rotates to cause oscillation of the head. Arms 11 are pivotally connected to guide arms 7 by a spindle 8. The die carrier 17 is fixed to the oscillating head and has demountably secured thereto a die block 18. Disposed transversely between and supported from the sides of the body there is a platen 20 having a hardened upper surface 20a which may be a separate plate secured to the platen in any suitable manner.

Mounted on and disposed transversely of the body we also provide a laminating element generally denoted 25 and which is comprised of a pair of parallel bars 26, 27 each of which has a felt wrapping 28. As shown in Fig. 10 we prefer to mount one of the bars, preferably the upper bar 27, so that it may be resiliently urged towards the other bar by means of springs 27a.

To accomplish this, we fix the lower bar 26 to the sides of the body, as by screws 26a and provide four screws 26b threaded into bar 26 and extending through holes in the upper bar 27, the springs 27a being interposed between the upper bar and the heads of screws 26b to urge the upper bar downwardly.

Journaled in the sides of the body we provide a pair of shafts 30, 31 upon which are fixed, respectively, rollers 32, 33. The peripheries of these rollers substantially contact each other so as to receive therebetween the label-forming strip or tape 35 and roller 33 has a soft rubber periphery. The uncoated tape is taken from a supply roller S upon which it has been rolled and then passes, around the coating roller 34, through a coating box, where the adhesive coating 35a is applied (Fig. 1).

Also journaled in the sides of the body there are three shafts 40, 41, 42 on which are fixed the respective rollers 43, 44, 45, the shafts being operatively connected by gear train 46 (see Fig. 9). One of the shafts, preferably shaft 42, is power driven from the shaft 15a which carries the eccentric 15 so that the rollers are driven in unison with operation of the oscillating head. The operative connection between the shaft 15a and roller 45 is described as follows:

As best shown in Fig. 8, shaft 15a also carries an eccentric 47 which rotates in an opening 48a in an arm 48 pivoted at its outer end by pin 48b to an arm 49 rotatably mounted at its outer end on shaft 42. Arm 49 pivotally carries a pawl 49a to engage the teeth of a ratchet 50 fixed on shaft 42. A resilient stop pawl 51 is secured at its outer end to the body and rides over the ratchet teeth. Thus, on each rotation of shaft 15a the rollers 43—45 are moved a step. We operatively connect roller 33 with shaft 42 as by a chain belt 53b which passes over toothed wheel 53 on shaft 42 and over a toothed wheel 53a on shaft 31 (Figs. 2 and 8).

The peripheries of rollers 43—45 normally substantially frictionally engage each other so as to frictionally receive therebetween, in addition to the label-forming and backing strips, an endless carrier belt or conveyor tape 52 which belt is moved by the rollers 43—45 and passes through the laminating member 25, sliding over the felt cover 28 of the bottom bar 26. The peripheral surface of roller 44 is of soft rubber or like resilient material.

An arm 55 carries guide members 56 which guide, from a supply roll (not shown), an elongated strip of backing tape 58, which tape conventionally is in the form of a thin cellulosic sheet known as "glassine." This tape 58 likewise is drawn through the laminating element by the rollers 43—45, slidably passing over the felt covering 28 of the upper bar 27, and thence between rollers 43—45 by which it is pulled.

Rollers 43—45 are driven intermittently, as will be hereinafter described—that is, they rotate a fraction of a rotation for each oscillation of the oscillating head 10, being rotated far enough in each operation to move the label-forming strip 35 from the position denoted $X_1$ to the position denoted $X_2$ in Fig. 11.

Figure 4:
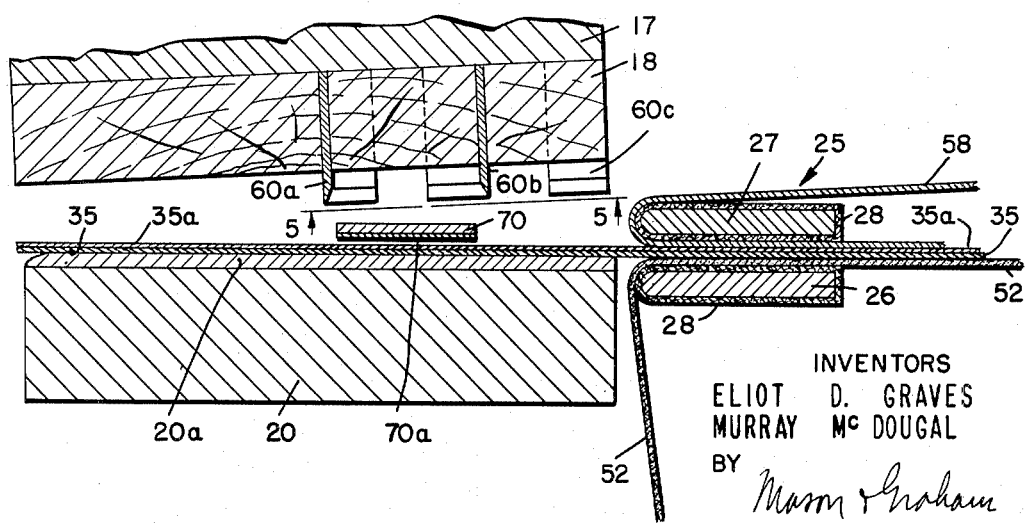
Fig. 4 is an enlarged fragmentary sectional view showing the die and laminating elements.

By particular reference to Figs. 4 and 5 it will be seen that the die block 18 carries three separate cutting elements, here denoted 60a, 60b, 60c, there being two like elements 60c. Cutting elements 60a, 60b define the ends and a portion of the sides of the label adjacent the ends, said elements being mounted in opposed relationship— that is, with their open ends facing each other—and being spaced apart to leave a gap 62 therebetween. In other words, assuming the label being cut to be of rectangular plan, as the label-forming strip 35 is drawn over the platen, upon each oscillation of the head 10 a label will be cut from the label-forming strip except for the side edge portions defined by the gap 62. During the next intermittent movement of the rollers 43—45 the label-forming strip will be advanced from the position $X_1$ to the position $X_2$ (Fig. 11) until that portion of the label to be cut by cutting element 60c is adjacent or about to enter the laminating element and the leading portion of the last previous cut by die elements 60b, denoted by dot-dash line L' in Fig. 11, will be positioned between the laminating bars. This will position the uncut portion of the label denoted by full lines L'' in Fig. 11 beneath the cutting element 60c. Thus, upon the next oscillation of the head 10 the cutting elements 60c will finally sever the label from the label-forming sheet and, simultaneously therewith, the cutting elements 60a, 60b will partially cut another label in the manner before described.

From the foregoing it will be observed that upon each oscillation of the head 10 and each intermittent movement of the rollers 43—45 a new label is partially cut by cutting elements 60a, 60b and the last preceding label cut by elements 60a, 60b is finally severed from the label-forming strip by cutting elements 60c. While the forward portion of the label being formed is adhered to the backing sheet 58 in the laminating element before the final cut is made, said label does not become completely adhered to the backing strip until after the final cut is made by cutting elements 60c, being subsequently moved into the laminating element to be completely adhered to the backing sheet.

As will be apparent from the foregoing description, the partially severed labeled portion is supported, reinforced and moved by means of the continuous belt 52.

Inasmuch as the adhesive coating 35a on the label-forming strip is on the top face of the strip, or towards the die block, in order to insure uniform stripping of the cut label portion from the die we provide a stripper plate 70. This plate is shaped to permit the cutting elements 60a, 60b to pass thereover, the plate presenting a roughened bottom surface 70a (Fig. 7), such as of sandpaper, to prevent the adhesive from adhering thereto. The stripper plate is supported from the sides of the body by means of the arms 71 secured to the body as by screws 72.

Upon leaving the rollers 43—45, the matrix 35b, which consists of that portion of the label-forming strip 35 from which the labels L have been severed, is separated from the backing strip 58 by means of being rolled onto a roller 75 driven by any suitable means (not shown) in synchronism with rollers 43—45. Simultaneously the backing strip 58 carrying the cut labels L is wound onto a roller 77, also driven in synchronism with rollers 43—45 by any suitable means (not shown).

While we have described the fabrication of only a single linear row of labels on the backing sheet, it will be obvious, of course, that as many parallel rows of labels may be cut and mounted on the backing sheet as may be desired, by having the label-forming strip 35 and the backing strip 58 relatively wider and by providing an additional set of die cutting elements 60a—60c for each row. It will be obvious also that our apparatus is not limited to the production of square or rectangular labels but may be designed and operated to produce labels of other shapes. For instance, in Fig. 14 we show a plan view of a set of die elements 80a, 80b, 80c for forming round labels L as shown in Fig. 15.

In Fig. 13 we show a modified form of die using only one die element 85 corresponding to previously described die elements 60a, 60b and one die element 86 corresponding to die elements 60c. Here die element 85 cuts the label from the label-forming strip except along one side, while element 86 finally severs the label by cutting along said side.

An added advantage of our apparatus is best illustrated in Fig. 16. As is well known in the art of making pressure-sensitive labels, the adhesive tends to flow from under the edges of a freshly cut label. This is particularly true where the labels are being cut from pre-laminated assemblies consisting of a label sheet adhered to a backing sheet. We avoid this since, in our apparatus when the label is cut the adhesive side of the coated label-forming sheet is towards the beveled edged die— the bevel being on the inner surface of the die element. Thus, the beveled surface of the die element tends to force the adhesive away from the edge of the label.

We claim:

1. In apparatus for cutting labels from an elongated label forming strip and adhering them to an elongated label backing sheet, a platen, a label cutting die disposed over and mounted for movement relative to the platen, a laminating element, strip moving means for moving the backing strip through the laminating element, said latter means also being operable to move the label forming strip between the platen and die with the adhesive coated surface of the latter strip disposed towards the die and thence through the laminating element to cause the label forming strip to adhere to the backing strip, and means for stripping the matrix portion of the label forming strip surrounding the cut labels from the backing strip after said strips have passed through said laminating element; said label forming die comprising separate sets of cutting blades, the first set defining the end portions of a label outline and the second set being spaced from the first set and defining the remainder of the label outline; said second set of blades being positioned to engage the label forming strip only after the leading end portion of the label to be finally cut thereby has become adhered to the backing sheet in said laminating element.

2. The apparatus of claim 1 wherein said laminating element comprises a pair of parallel bars arranged to pass said strips therebetween in pressure engagement therewith, and wherein one of said bars has a yieldable surface facing the other bar.

3. In apparatus for cutting labels from an elongated adhesive coated label-forming strip and adhering them to an elongated backing strip, a platen, a laminating element, strip-actuating means for intermittently moving the label-forming strip in a path extending over the platen and through the laminating element, and for simultaneously moving the backing strip through the laminating element in contact with a portion of the label-forming strip which has been moved over the platen, hollow die means mounted for reciprocatory movement toward and away from the platen and operable in synchronism with the strip-actuating means to cut a label outline from said label-forming strip before said strip enters the laminating element, a stripper positioned between the die means and the path of movement of the label-forming strip, said stripper being of such size in relation to the die means as to enter said die means as said die means is moved toward said path of movement of said label-forming strip, means for reciprocating the die means and means for stripping the matrix portion of the label-forming strip after said strip is moved out of the laminating element; said strip-actuating means being positioned to engage said label-forming strip only after the label-forming strip has passed over said platen.

4. In apparatus for cutting labels from an elongated label-forming strip and adhering them to an elongated label-backing sheet, a platen, a hollow label cutting die disposed over and mounted for movement relative to the platen, a laminating element, strip moving means for moving said backing strip through said laminating element, said latter means also being operable to move said label-forming strip in a path extending between the platen and die with the adhesive coated surface of the latter strip disposed toward the die and thence through the laminating element to cause the label-forming strip to adhere to the backing strip, a stripper mounted between the die and said path of movement of said label-forming strip, said stripper being smaller than said die and being shaped to enter said die as said die moves toward said path of movement of said label-forming strip, and means for stripping the matrix portion of the label-forming strip surrounding the cut labels from the backing strip after said strips have passed through said laminating element; said strip moving means being positioned to engage the label-forming strip only after the label-forming strip has passed over said platen.

5. The apparatus of claim 4 wherein said strip moving means includes a power driven roller and a continuous belt mounted for movement through the laminating element beneath said label forming strip.

References Cited in the file of this patent

UNITED STATES PATENTS

| | | |
|---|---|---|
| 1,692,387 | Schmitt | Nov. 20, 1928 |
| 1,993,082 | Blair et al. | Mar. 5, 1935 |
| 2,127,960 | Piazze | Aug. 23, 1938 |
| 2,186,799 | Boker | Jan. 9, 1940 |
| 2,220,071 | Avery | Nov. 5, 1940 |
| 2,303,346 | Flood | Dec. 1, 1942 |
| 2,304,787 | Avery | Dec. 15, 1942 |
| 2,338,596 | Pitt | Jan. 4, 1944 |
| 2,362,088 | Payne | Nov. 7, 1944 |